United States Patent
Fukushima et al.

(10) Patent No.: US 8,304,671 B2
(45) Date of Patent: Nov. 6, 2012

(54) POSITION INDICATOR AND COORDINATE INPUT DEVICE

(75) Inventors: Yasuyuki Fukushima, Kitakatsushika-gun (JP); Hiroyuki Fujitsuka, Kitakatsushika-gun (JP)

(73) Assignee: Wacom Co., Ltd., Saitama (JP)

( * ) Notice: Subject to any disclaimer, the term of this patent is extended or adjusted under 35 U.S.C. 154(b) by 1091 days.

(21) Appl. No.: 12/209,165

(22) Filed: Sep. 11, 2008

(65) Prior Publication Data
US 2009/0084614 A1    Apr. 2, 2009

(30) Foreign Application Priority Data
Sep. 28, 2007 (JP) ................. 2007-254637

(51) Int. Cl.
  G06F 3/033   (2006.01)
  G06F 3/041   (2006.01)
  G06K 11/06   (2006.01)
  G08C 21/00   (2006.01)
(52) U.S. Cl. ..................... 178/19.03; 345/179
(58) Field of Classification Search ............. 345/179; 178/19.03, 19.06, 18.06, 18.07, 43, 64
See application file for complete search history.

(56) References Cited

U.S. PATENT DOCUMENTS

| | | | |
|---|---|---|---|
| 5,206,785 A | 4/1993 | Hukashima | |
| 5,854,881 A * | 12/1998 | Yoshida et al. | 345/104 |
| 5,883,338 A | 3/1999 | Trunck | |
| 6,853,369 B2 | 2/2005 | Fukushima | |
| 6,888,538 B2 * | 5/2005 | Ely et al. | 345/173 |
| 2003/0122795 A1 | 7/2003 | Fujitsuka | |
| 2005/0030297 A1 * | 2/2005 | Burstrom et al. | 345/179 |
| 2006/0060393 A1 | 3/2006 | Fukushima | |
| 2009/0065269 A1 * | 3/2009 | Katsurahira | 178/19.06 |

FOREIGN PATENT DOCUMENTS

| | | |
|---|---|---|
| EP | 1 643 351 A2 | 4/2006 |
| JP | 42-1339 U | 1/1942 |
| JP | 55-107380 U | 7/1980 |
| JP | 5-87630 U | 11/1993 |
| JP | 10-91314 A | 4/1998 |
| JP | 2001-319831 A | 11/2001 |
| JP | 2004-87685 A | 3/2004 |
| JP | 2006-65757 A | 3/2006 |

OTHER PUBLICATIONS

Mizuno, T., et al., "Reduction of Proximity Effect in Coil Using Magnetoplated Wire," IEEE Transactions on Magnetics 43(6):2654-2656, Jun. 2007.
European Search Report dated Nov. 4, 2009, issued in corresponding 08016654.9, filed Sep. 22, 2008.

* cited by examiner

Primary Examiner — Kevin M Nguyen
Assistant Examiner — Kenneth B Lee, Jr.
(74) Attorney, Agent, or Firm — Seed IP Law Group PLLC (57) ABSTRACT

A position indicator includes a case (2), and a rod (3) housed in the case (2). The rod (3) is passed through a cylindrical ferrite core (6) so that its indicating portion (31) (e.g., pen tip) protrudes from an end of the ferrite core (6). A position detecting coil (4) is wound around the periphery of the ferrite core (6). A switch section (5) (e.g., pressure detector) for detecting the pen pressure of the rod (3) is arranged on the other end of the ferrite core (6). An elastic shock-absorbing member (7) is also attached to the other end of the ferrite core (6), so that the shock-absorbing member (7) is fitted between the ferrite core (6) and the switch section (5). Since any impact force applied to the position indicator is alleviated by the shock-absorbing member (7), damage to the ferrite core (6) and the rod (3) can be prevented or reduced.

12 Claims, 6 Drawing Sheets

POSITION INDICATOR AND COORDINATE INPUT DEVICE

CROSS REFERENCES TO RELATED APPLICATIONS

The present application claims priority under 35 U.S.C. §119 from Japanese Patent Application JP 2007-254637 filed in the Japanese Patent Office on Sep. 28, 2007, the entire content of which is incorporated herein by reference.

BACKGROUND OF THE INVENTION

1. Field of the Invention

The present invention relates to a position indicator formed by winding a coil around a ferrite core, and a coordinate input device equipped with the position indicator. More particularly, the present invention relates to a position indicator in which an external impact force transmitted to a ferrite core and a rod passing through the ferrite core can be absorbed or alleviated, and a coordinate input device equipped with such position indicator.

2. Description of the Related Art

In recent years, a coordinate input device has been used as an input device for a personal computer, for example. Such a coordinate input device is configured by a pen-like position indicator and a position detecting device having an input surface where an input operation is performed using the position indicator, such as a pointing operation, a handwritten character input operation, and/or a hand-drawn illustration input operation.

Further, as a drive method for performing the position detecting, there is a drive method called "electromagnetic induction method" in which the position indicator is provided with a resonant circuit, which resonates with an electromagnetic wave of a specified frequency transmitted from the position detecting device, and the position of the position indicator relative to the position detecting device is indicated by transmitting a resonant signal from the position indicator to the position detecting device.

In the aforesaid electromagnetic induction method, the position indicator includes a position detecting coil and a capacitor forming the resonant circuit, and a rod passing through the position detecting coil. Generally, the position detecting coil is wound around the periphery of a cylindrical ferrite core, and the rod passes through a hole of the ferrite core (see, for example, Japanese Unexamined Patent Application Publication No. 2001-319831, corresponding to U.S. Pat. No. 6,853,369, which is incorporated by reference herein). The purpose of winding the position detecting coil around the periphery of the ferrite core is to increase the magnetic field intensity so as to improve the accuracy of position detection.

SUMMARY OF THE INVENTION

However, the ferrite core is made of a material that cannot be easily deformed elastically (i.e., hard to bend or flex), and further, since the rod passes through the hole of the ferrite core, the rod passing through the ferrite core is hard to bend in the radial direction. Also, a pen pressure detector is attached to a proximal end in the axial direction of the ferrite core in a prior position indicator, such that there is no room for the ferrite core to move in the axial direction. As a result, when the position indicator is subjected to an impact, such as being dropped onto the floor, the impact force will be completely transmitted to the ferrite core and the rod without being alleviated. Then, due to the impact force, the ferrite core and the rod may be damaged, and therefore the position indicator may not function properly.

In view of the aforesaid problems, it is an object of the present invention to provide a position indicator, in which damage to the ferrite core and the rod caused by an external impact force can be prevented or reduced, and a coordinate input device equipped with such a position indicator.

A position indicator according to an aspect of the present invention includes: a case; a ferrite core housed in the case and having a hole; a rod arranged to pass through the hole of the ferrite core, one end thereof protruding from one end in the axial direction of the ferrite core to the outside of the case to serve as an indicating portion (e.g., pen tip), and the other end thereof protruding from the other end of the ferrite core; a coil wound around a periphery of the ferrite core; and a shock-absorbing member engaged with the other end in the axial direction of the ferrite core to improve impact resistance against an impact applied to the position indicator.

A coordinate input device according to another aspect of the present invention includes: a position detecting device having an input surface; and a position indicator for indicating its coordinates on the input surface of the position detecting device, wherein the position indicator includes: a case; a ferrite core housed in the case and having a hole; a rod arranged to pass through the hole of the ferrite core, one end thereof protruding from one end in the axial direction of the ferrite core to the outside of the case to serve as an indicating portion, and the other end thereof protruding from the other end of the ferrite core; a coil wound around a periphery of the ferrite core; and a shock-absorbing member engaged with the other end in the axial direction of the ferrite core to improve impact resistance against an impact applied to the position indicator.

Using the position indicator and the coordinate input device according to the present invention, by attaching a shock-absorbing member to the ferrite core, allows the external impact to be absorbed or alleviated by the shock-absorbing member, and damage to the ferrite core and the rod can be prevented.

DETAILED DESCRIPTION OF THE PREFERRED EMBODIMENT(S)

Figure 4:
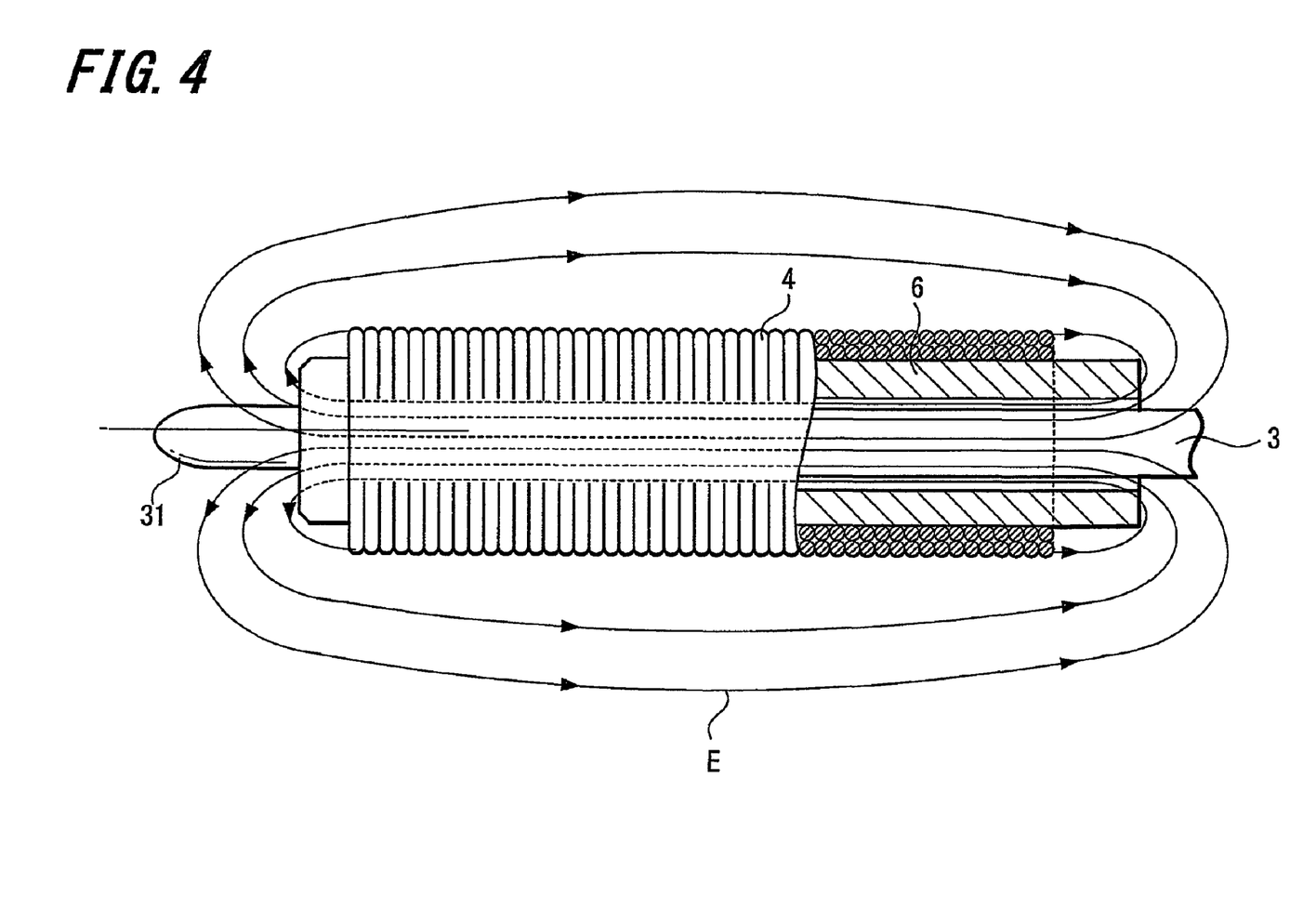
FIG. 4 is a view showing a magnetic field generated by a position detecting coil of the position indicator.
Figure 5:
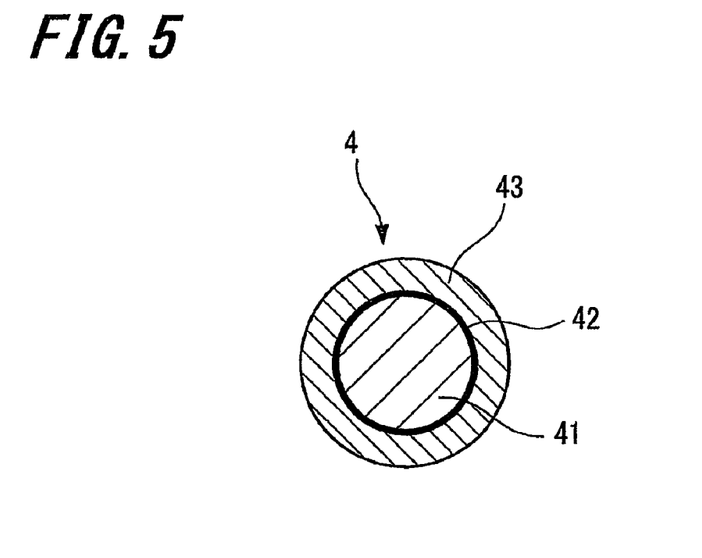
FIG. 5 is a cross sectional view of a wire forming the position detecting coil of the position indicator according to an embodiment of the present invention.
Figure 6:
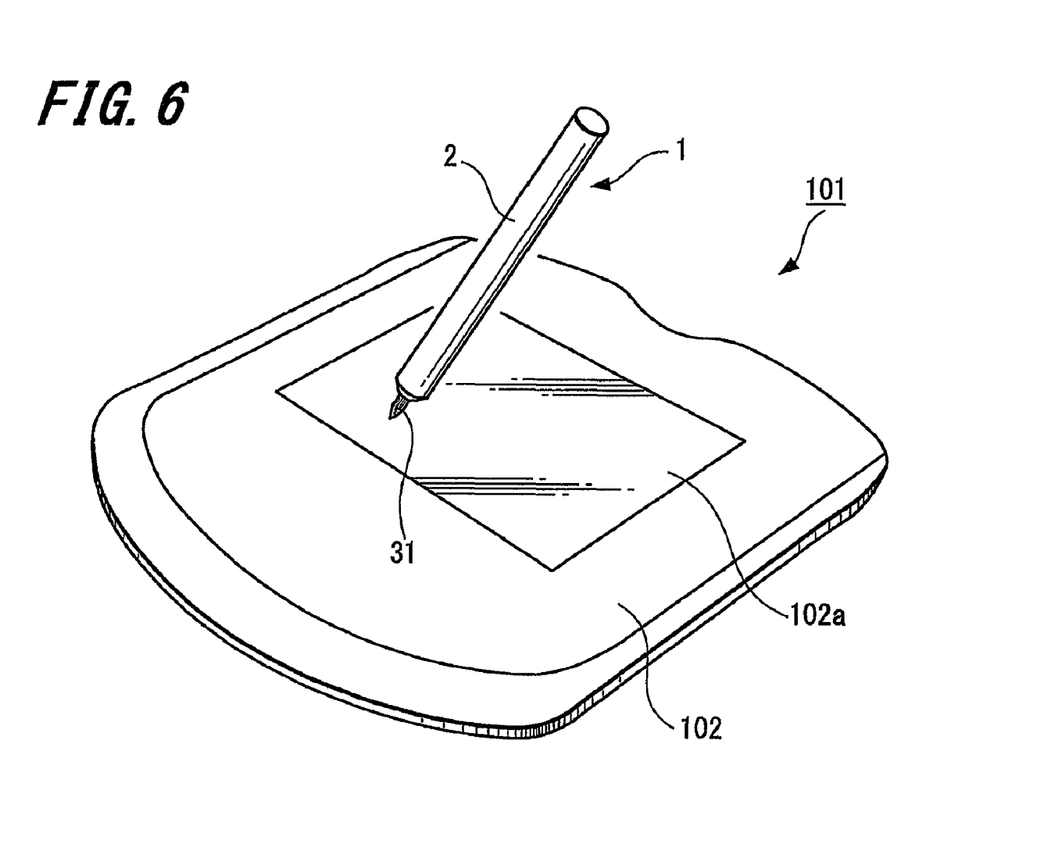
FIG. 6 is a perspective view showing an example of a coordinate input device according to the present invention.
Figure 7:
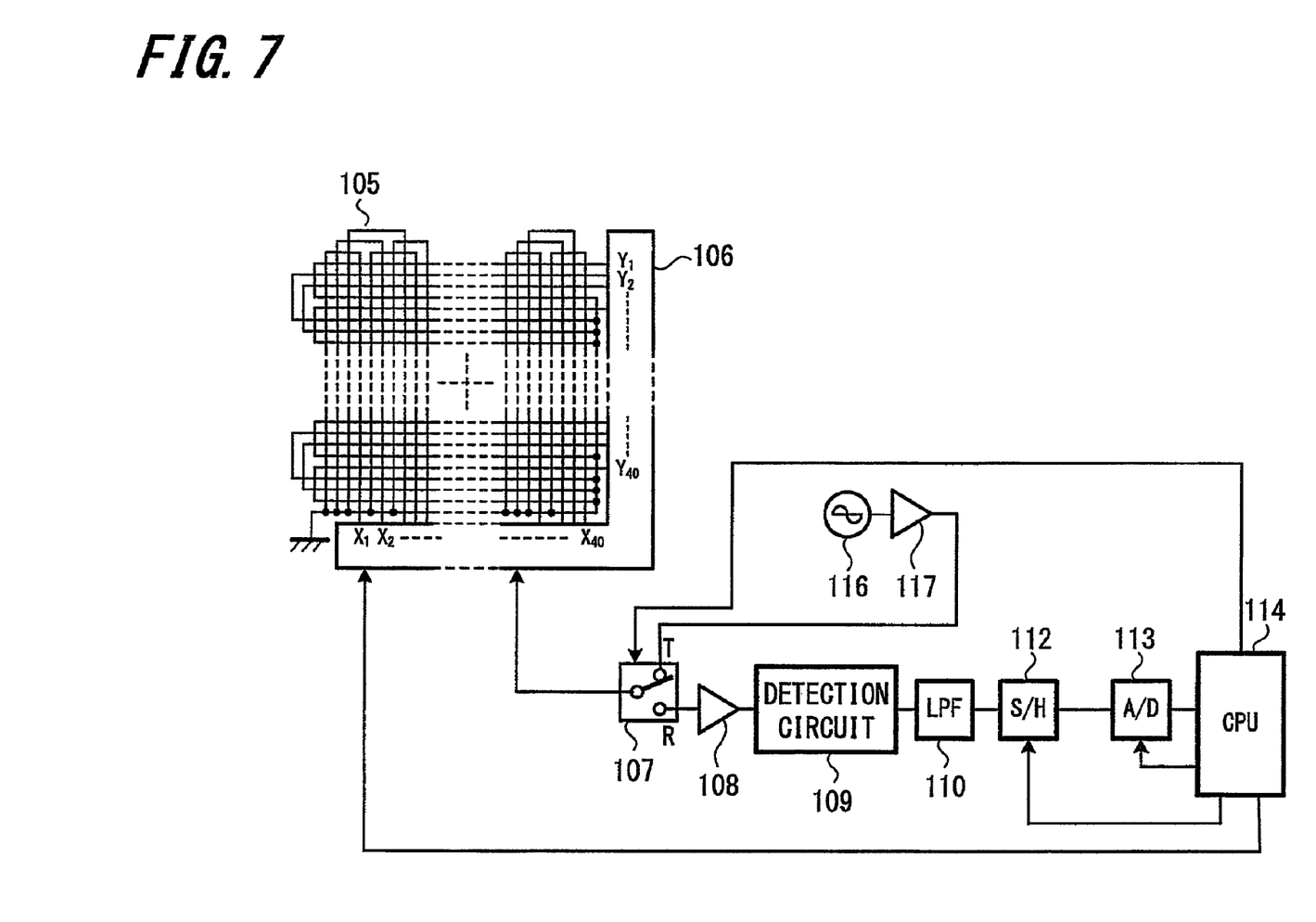
FIG. 7 is a block diagram showing a configuration of a position detecting device of the coordinate input device according to an example of the present invention.

FIGS. 1 to 7 are drawings for explaining various exemplary embodiments of the present invention. FIGS. 1 to 5 show a position indicator according to an embodiment of the present invention, FIG. 6 shows a coordinate input device according to an embodiment of the present invention, and FIG. 7 shows a configuration of a position detecting device used in the coordinate input device as shown in FIG. 6.

FIGS. 1 to 5 show a configuration of a position indicator 1 according to an embodiment of the present invention. By means of electromagnetic induction, the position indicator 1 indicates its position relative to the position detecting device shown in FIG. 6. Specifically, the position indicator 1 includes a resonant circuit which resonates with an electromagnetic wave of a specific frequency transmitted from the position detecting device, and the position indicator 1 indicates its own position relative to the position detecting device by transmitting a signal resonated in the resonant circuit to the position detecting device.

Figure 1:
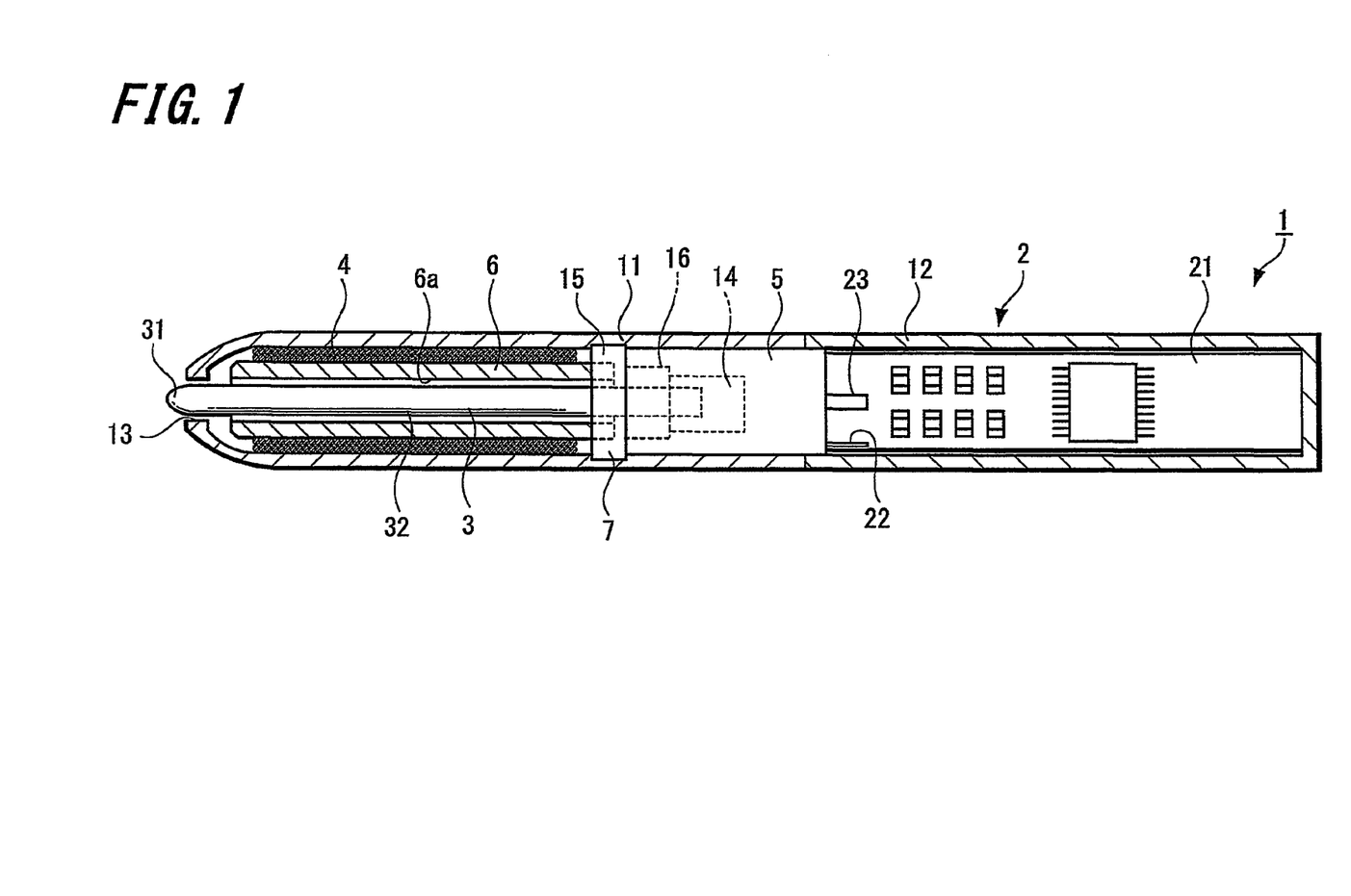
FIG. 1 is a cross sectional view showing a configuration of a position indicator according to an embodiment of the present invention.

FIG. 1 is a cross sectional view showing the position indicator according to an embodiment of the present invention. The position indicator 1 includes a case 2 (for example, a housing serving as an exterior portion of the position indicator 1), a rod 3, a position detecting coil 4, a switch section 5 (for example, a pen pressure detector), and a ferrite core 6.

The case 2 of the position indicator 1 is a bottomed cylindrical case having one end thereof closed. In the illustrated embodiment, the case 2 includes a first case 11 and a second case 12, which are coupled with each other in an axial direction. One end in the axial direction of the first case 11 is substantially cone-shaped, and an opening 13 is formed near the tip of the cone-shaped end. Further, another opening is formed on the other end in the axial direction of the first case 11.

The second case 12 is a bottomed cylindrical case having one end thereof open and the other end thereof closed. A printed circuit board 21 having electronic components mounted thereon is fixed inside the second case 12 by a fixing means such as an adhesive or a fixing screw. Further, the first case 11 and the second case 12 are coaxially arranged, and fixed to each other by a fixing means such as an adhesive or a fixing screw.

The rod 3 includes an indicating portion 31 serving as a pen tip, and a shaft portion 32 continuing from the indicating portion 31. The rod 3 is accommodated in the case 2 along the axial direction of the case 2. The indicating portion 31 is substantially cone-shaped. When the rod 3 is accommodated in the case 2, the indicating portion 31 protrudes to the outside from the opening 13 of the first case 11. A rod holder 14 is attached to the other end of the shaft portion 32 opposite from the indicating portion 31.

The rod holder 14 is substantially of a cylindrical shape and is formed with a recessed portion. The other end of the shaft portion 32 is inserted into the recessed portion of the rod holder 14. An outer wall of the rod holder 14 provides an engaging portion, to be described immediately below. The rod holder 14 is inserted into an opening 5a (see FIG. 2) of the switch section 5. At the same time, the engaging portion (i.e., the outer wall) of the rod holder 14 is engaged with an engaged portion (i.e., an inner wall) of the switch section 5, and therefore the rod holder 14 is attached to the switch section 5. When the rod holder 14 is attached to the switch section 5, and when pressure (pen pressure) is applied to the indicating portion 31 of the rod 3, the rod holder 14, attached to the other end of the rod 3, will press the switch section 5.

The switch section 5 is provided with a switch which performs an on/off switching operation in response to the applied pressure. During the on/off switching operation, the switch section 5 detects contact of the indicating portion 31 with the input surface of the position detecting device shown in FIG. 6. The switch section 5 includes two terminals 22, 23 connected to the printed circuit board 21. The terminals 22, 23 are respectively electrically connected to the electronic components of the printed circuit board 21. Incidentally, the switch section 5 is substantially of a cylindrical shape, and one end thereof is open. Further, an inner wall of the switch section 5 includes an internal engaged portion to be engaged with the external engaging portion (i.e., the outer wall) of the rod holder 14.

Figure 2:
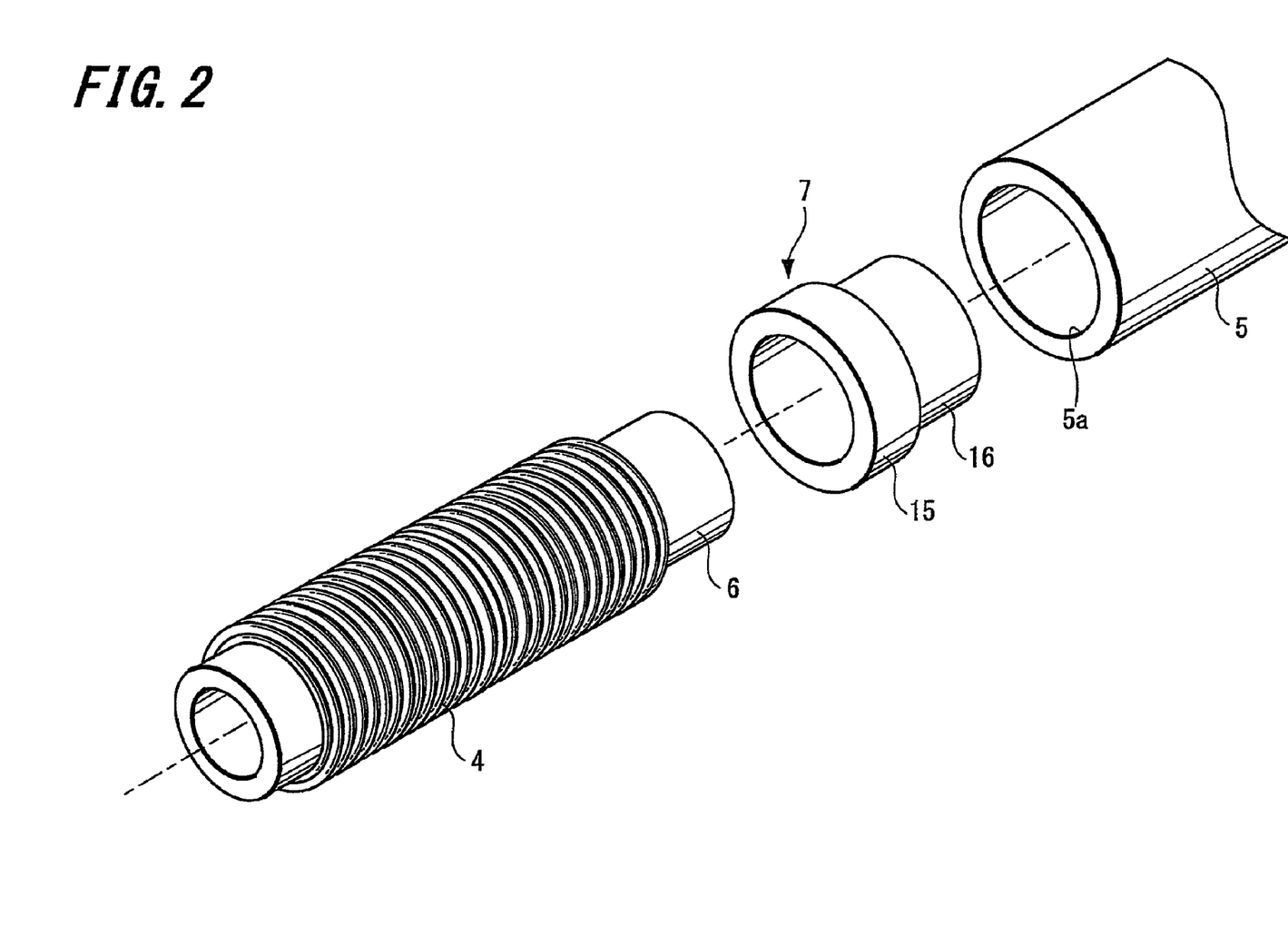
FIG. 2 is an exploded perspective view showing a primary portion of the position indicator according to an embodiment of the present invention.
Figure 3:
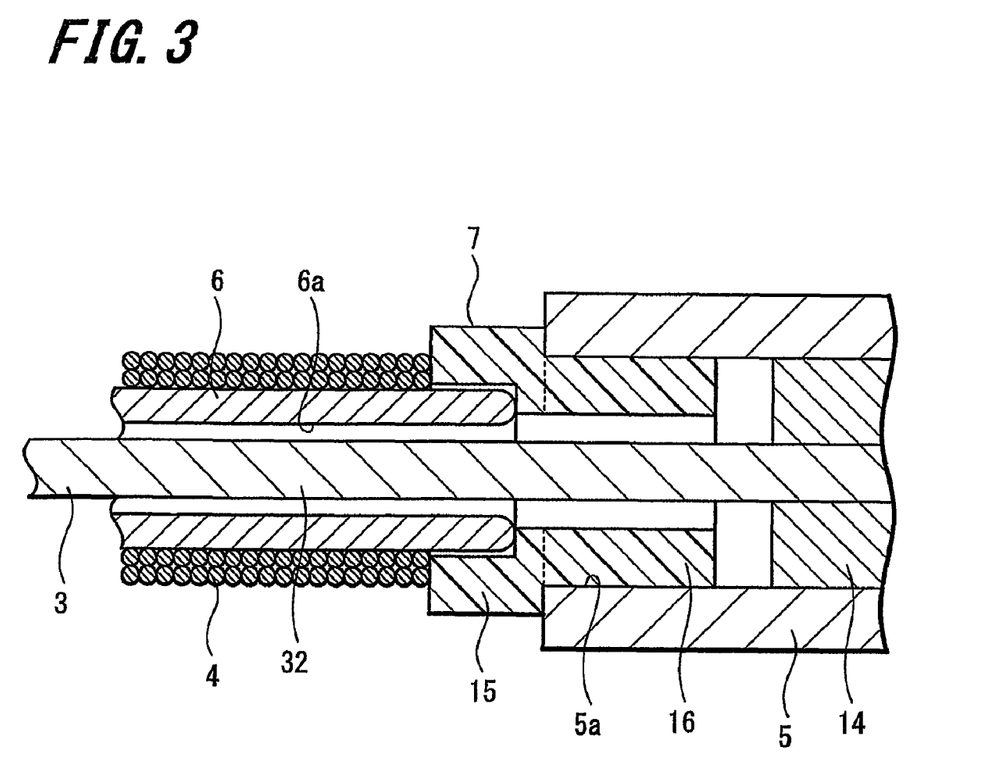
FIG. 3 is an enlarged cross sectional view showing the primary portion of the position indicator shown in FIG. 2.

An arrangement for attaching a shock-absorbing member 7 of the position indicator 1 to the switch section 5 and the ferrite core 6 will be described below with reference to FIGS. 2 and 3. FIG. 2 is an exploded perspective view showing a primary portion of the position indicator according to an embodiment of the present invention, and FIG. 3 is an enlarged cross section showing the same primary portion.

As shown in FIG. 2, the ferrite core 6 is of a cylindrical shape. In the illustrated embodiment, the length of the ferrite core 6 in an axial direction is set to be 14 mm. As shown in FIG. 1, the rod 3 passes through the hole 6a of the ferrite core 6, and the indicating portion 31 of the rod 3 protrudes from the one end in the axial direction of the ferrite core 6 to the outside of the case 2. The shock-absorbing member 7 is attached to the other end in the axial direction of the ferrite core 6.

The shock-absorbing member 7 has a shape generally formed by connecting two cylinders (circular rings) of different diameters in the axial direction. The shock-absorbing member 7 includes a first cylindrical portion 15, and a second cylindrical portion 16 which has a smaller diameter than that of the first cylindrical portion 15. The inner diameter of the first cylindrical portion 15 is set to be substantially equal to the outer diameter of the ferrite core 6. The outer diameter of the second cylindrical portion 16 is set to be substantially equal to the inner diameter of the opening 5a of the switch section 5. The first cylindrical portion 15 and the second cylindrical portion 16 are arranged such that their respective central axes are coaxially aligned. Further, as shown in FIG. 1, one end, in the axial direction of the second cylindrical portion 16, is continuously connected to the other end in the axial direction of the first cylindrical portion 15.

Note that, although the shock-absorbing member 7 has a shape generally formed by connecting two cylinders in the axial direction in the illustrated embodiment, the present invention is not limited thereto. For example, the shock-absorbing member 7 may have a shape formed by connecting two square cylinders in the axial direction, or may have a shape of one cylinder. According to various exemplary embodiments of the present invention, when the ferrite core 6 is held inside the case 2, a shock-absorbing member is engaged with the ferrite core 6 at least on the side opposite from the side where the pen tip protrudes to the outside of the case 2, thereby improving the resistance to an impact applied to the position indicator.

As shown in FIG. 3, the other end of the ferrite core 6 is inserted into the through-hole of the first cylindrical portion 15 of the shock-absorbing member 7, and the second cylindrical portion 16 of the shock-absorbing member 7 is inserted into the opening 5a of the switch section 5. Further, the shaft portion 32 of the rod 3 passes through the through-hole of the first cylindrical portion 15 and the through-hole of the second cylindrical portion 16. Thus, the shock-absorbing member 7 is fitted between the ferrite core 6 and the switch section 5. The shock-absorbing member 7 may be made of an elastic material, and preferably be made of silicon rubber or the like.

By attaching the elastic shock-absorbing member 7 to the other end of the ferrite core 6, when an external impact is applied to the position indicator 1, the impact force can be absorbed or alleviated owing to the elastic deformation of the shock-absorbing member 7. Since the impact force transmitted to the ferrite core 6 and the rod 3 is alleviated, any damage to the ferrite core 6 and the rod 3 caused by the impact can be prevented or reduced.

However, since the shock-absorbing member 7 is fitted between the ferrite core 6 and the switch section 5, the length of the position indicator 1 in the axial direction becomes longer compared with a prior position indicator having no shock-absorbing member 7. Thus, it becomes necessary to increase the length of the case 2 in the axial direction. Thus, when producing a position indicator having a shock-absorbing member, a special case may have to be designed, and that may increase production cost. To make use of a case commonly used by a prior position indicator, it may be desired to reduce the length of the ferrite core 6 in the axial direction when producing a position indicator 1 having the shock-absorbing member 7 fitted between the ferrite core 6 and the switch section 5. However, if the length of the ferrite core 6 in the axial direction is reduced, the number of turns of the position detecting coil 4 wound around the periphery of the ferrite core 6 may not be sufficient to obtain an adequately strong magnetic field.

To solve this potential problem, in accordance with various exemplary embodiments of the present invention and as shown in FIG. 3, a desired magnetic field can be obtained by N-fold (N>1) winding the position detecting coil 4 (for example, doubly winding the position detecting coil 4) around the periphery of the ferrite core 6. Incidentally, both ends (not shown) of the position detecting coil 4 are respectively electrically connected to the electronic components through the printed circuit board 21.

With N-fold winding, the magnetic field generated by the position detecting coil 4 is strengthened, so that a sufficient magnetic field can be obtained even when the length of the ferrite core 6 in the axial direction is reduced. N may be any number greater than 1.

However, when the position detecting coil 4 is N-fold wound in the aforesaid manner, a magnetic field B generated by the position detecting coil 4 might be attenuated due to the proximity effect caused by the coil 4 itself, as shown in FIG. 4. Specifically, a current flowing in the opposite direction to the current originally flowing in the position detecting coil 4 may be generated in the position detection coil 4, to thereby attenuate the magnetic field B originally generated by the position detecting coil 4. Thus, a magnetic field of desired strength may not be obtained from the position indicator 1, and therefore position detection may not be accurately performed.

To solve this problem, in accordance with one aspect of the present invention, a magnetic-plated wire, for example, is used as the material of the position detecting coil 4. As shown in FIG. 5, the magnetic-plated wire includes a copper wire 41, a thin film layer 42 coated on the outer surface of the copper wire 41, and a polyurethane insulating film layer 43 baked on the outer surface of the thin film layer 42. The thin film layer 42 is made of a ferromagnetic substance. Due to the provision of the thin film layer 42 made of a ferromagnetic substance, the magnetic field generated by the position detecting coil 4 passes through the thin film layer 42 without penetrating the copper wire 41. Thus, in the position detecting coil 4, a newly generated current, that flows in a direction hindering the flow of the original current generating the magnetic field, can be reduced.

As described above, the strength of the magnetic field can be ensured by N-fold (N>1) winding the position detecting coil 4 (for example, doubly winding the position detecting coil 4). Further, when the magnetic-plated wire is used as the material of the position detecting coil 4, the current newly generated in the position detecting coil 4 by the magnetic field of the position detecting coil 4 can be reduced, so that the Q-factor of the coil 4 does not degrade.

The position indicator 1, having the aforesaid configuration, may be assembled by the following steps. First, the position detecting coil 4 is N-fold wound around the periphery of the ferrite core 6, so that a coil assembly composed of the position detecting coil 4 is formed. Then, the shock-absorbing member 7 is attached to the other end in the axial direction of the ferrite core 6 of the coil assembly. Thereafter, the rod 3 is passed through the hole 6a of the ferrite core 6 to which the shock-absorbing member 7 has been attached, and the rod holder 14 is attached to the other end in the axial direction of the rod 3.

Then the rod holder 14, attached to the rod 3, is inserted into the opening 5a of the switch section 5 where the engaged portion of the switch section 5 is engaged with the engaging portion of the rod holder 14. At this time, the second cylindrical portion 16 of the shock-absorbing member 7 attached to the ferrite core 6 is inserted into the opening 5a of the switch section 5 so that the shock-absorbing member 7 is fitted between the ferrite core 6 and the switch section 5. Next, the two terminals 22, 23 of the switch section 5, and both ends of the position detecting coil 4, are electrically connected to respective electronic components of the printed circuit board 21.

Thereafter the printed circuit board 21 is fitted into the second case 12 and fixed to the second case 12 by a fixing means such as an adhesive or a fixing screw. Then the other end in the axial direction of the first case 11 is brought toward the one end in the axial direction of the second case 12, in which the printed circuit board 21 has been seated, and coupled to the one end of the second case 12 so as to close the opening at one end of the second case 12. At this time, the indicating portion 31 of the rod 3 protrudes to the outside via the opening 13 of the first case 11. Further, the overlapping portions of the first case 11 and the second case 12 are fixed to each other by a fixing means such as an adhesive or a fixing screw, and the assembling work of the position indicator 1 is completed. Note that the assembling steps of the position indicator 1 are not limited to the above-mentioned steps and other variations are obvious to one skilled in the art. For example, the printed circuit board 21 may be firstly fixed to the second case 12.

FIG. 6 shows an example of a coordinate input device equipped with the position indicator 1 having the aforesaid configuration and function. FIG. 7 is a block diagram showing a position detecting device of the coordinate input device shown in FIG. 6.

As shown in FIG. 6, a coordinate input device 101 according to an embodiment of the present invention includes a position detecting device 102 having an input surface 102a, and the position indicator 1 for indicating its own position relative to the input surface 102a of the position detecting device 102. By connecting the position detecting device 102 to an external unit (not shown) such as a personal computer or a PDA (Personal Digital Assistant), the coordinate input device 101 serves as an input device of such an external unit.

A configuration of the position detecting device 102 of the coordinate input device 101 and a position detecting method using the position detecting device 102 will be briefly described below with reference to FIG. 7.

The position detecting device 102 of the coordinate input device 101 is substantially of a rectangular flat plate shape. One flat surface of the position detecting device 102 has the input surface 102a arranged thereon, and the other flat surface of the position detecting device 102 opposite the input surface 102a serves as a mounting surface. Inside the position detecting device 102, an electromagnetic induction type position detecting section 105, as shown in FIG. 7, is provided in a position corresponding to the input surface 102a.

The position detecting section 105 includes, for example, forty loop coils $X_1$ to $X_{40}$ and forty loop coils $Y_1$ to $Y_{40}$ respectively arranged in an X-axis direction and a Y-axis direction. Each of the loop coils $X_1$ to $X_{40}$ and loop coils $Y_1$ to $Y_{40}$ is connected to a selecting circuit 106 for selecting the loop coils $X_1$ to $X_{40}$ and loop coils $Y_1$ to $Y_{40}$. Note that, although the number of the loop coils is forty in the present embodiment, it does not have to be limited to forty.

The selecting circuit 106 is connected to a transmission/reception switching circuit 107, and a reception side of the transmission/reception switching circuit 107 is connected to an amplifier 108. The amplifier 108 is connected to a detection circuit 109, and the detection circuit 109 is connected, via a LPF (low-pass filter) 100, to a sample-and-hold circuit 112. Further, the sample-and-hold circuit 112 is connected to an A/D conversion circuit (analog-digital conversion circuit) 113, and the A/D conversion circuit 113 is connected to a CPU 114 (central processing unit) 114. Further, the CPU 114 supplies control signals respectively to the selecting circuit 106, the sample-and-hold circuit 112, the A/D conversion circuit 113, and the transmission/reception switching circuit 107.

The position detecting device 102 is further provided with an oscillator 116 for generating an AC signal having a frequency $f_0$, and a current driver 117 for converting the AC signal to a current. The current driver 117 is connected to a transmission side of the transmission/reception switching circuit 107. When the contact point of the transmission/reception switching circuit 107 is switched to the transmission side in response to the control signal supplied from the CPU 114, a magnetic field is generated by the loop coils $X_1$ to $X_{40}$ and loop coils $Y_1$ to $Y_{40}$ of the position detecting section 105.

When the position indicator 1 approaches the position detecting section 105, the resonant circuit built in the position indicator 1 will resonate so as to generate an induced voltage. Next, the contact point of the transmission/reception switching circuit 107 is switched to the reception side in response to the control signal supplied from the CPU 114. In response to this switching operation, the supply of the magnetic field to the position indicator 1 is stopped, and the signal induced in the resonant circuit is transmitted from the position detecting coil 4 to the position detecting section 105. In the position detecting section 105, by receiving the signal transmitted from the position detecting coil 4 (by suitably selecting the loop coils $X_1$ to $X_{40}$ and loop coils $Y_1$ to $Y_{40}$ to detect the signal transmitted from the position detecting coil 4), the position indicated by the position indicator 1 is detected.

As described above, in the position indicator of the present invention, since the elastic shock-absorbing member is engaged with the ferrite core, when an external impact force is applied to the position indicator, the impact force can be absorbed or alleviated due to the elastic deformation of the shock-absorbing member. Thus, damage to the ferrite core and the rod caused by the external impact force can be prevented.

Further, by N-fold (N>1) winding the position detecting coil (for example, doubly winding the position detecting coil) around the ferrite core, the number of the turns of the coil is increased. Furthermore, when the magnetic-plated wire is used as the material of the position detecting coil, possible attenuation of the magnetic field generated by the position detecting coil can be alleviated. As a result, the detecting sensitivity of the position detecting coil can be increased, and its efficiency as a high frequency coil (Q-factor) can be improved. Thus, Q-factor degradation caused by reducing the length of the ferrite core in the axial direction in order to engage the shock-absorbing member to the ferrite core can be prevented.

It is to be understood that the present invention is not limited to the embodiments described above and illustrated in the attached drawings, and various modifications can be made without departing from the spirit and scope of the present invention as described in claims.

What is claimed is:

1. A position indicator comprising:
a case;
a pressure detector housed in the case;
a ferrite core held in the case and having a hole;
a rod arranged to pass through the hole of the ferrite core,
   a distal end thereof protruding from a distal end in the axial direction of the ferrite core to the outside of the case to serve as a position indicating portion, and a proximal end thereof protruding from a proximal end of the ferrite core and being positioned and configured to press upon the pressure detector when a pressure is applied to the position indicating portion of the rod;
a coil wound around a periphery of the ferrite core; and
a shock-absorbing member formed of elastic material and engaged between the proximal end of the ferrite core and the pressure detector to elastically couple the ferrite core with the pressure detector and so as to alleviate an external impact applied to the case from being transmitted to the ferrite core;
wherein the pressure detector is configured to detect the pressure applied to the position indicating portion of the rod; and
wherein the shock-absorbing member comprises a first cylindrical portion that connects with the proximal end of the ferrite core and a second cylindrical portion that connects with the pressure detector, an inner diameter of the first cylindrical portion is substantially equal to an outer diameter of the ferrite core, and the pressure detector includes a first mating portion and the second cylindrical portion includes a second mating portion that is configured to engage with the first mating portion.

2. The position indicator according to claim 1, wherein the coil is formed by a magnetic-plated wire.

3. The position indicator according to claim 1, wherein the coil is N-fold wound around the periphery of the ferrite core, where N is greater than one.

4. A coordinate input device comprising:
a position detecting device having an input surface; and
a position indicator for indicating its coordinates on the input surface of the position detecting device,
wherein the position indicator includes:
   a case;
   a pressure detector housed in the case;
   a ferrite core held in the case and having a hole;
   a rod arranged to pass through the hole of the ferrite core,
      a distal end thereof protruding from a distal end in the axial direction of the ferrite core to the outside of the case to serve as a position indicating portion, and a proximal end thereof protruding from a proximal end of the ferrite core and being positioned and configured to press upon the pressure detector when a pressure is applied to the position indicating portion of the rod;
   a coil wound around a periphery of the ferrite core; and a shock-absorbing member formed of elastic material and engaged between the proximal end of the ferrite core and the pressure detector to elastically couple the ferrite core with the pressure detector and so as to alleviate an external impact applied to the case from being transmitted to the ferrite core;

wherein the shock-absorbing member comprises a first cylindrical portion that connects with the proximal end of the ferrite core and a second cylindrical portion that connects with the pressure detector, an inner diameter of the first cylindrical portion is substantially equal to an outer diameter of the ferrite core, and the pressure detector includes a first mating portion and the second cylindrical portion includes a second mating portion that is configured to engage with the first mating portion.

5. The coordinate input device according to claim 4, wherein the coil is formed by a magnetic-plated wire.

6. The coordinate input device according to claim 4, wherein the coil is N-fold wound around the periphery of the ferrite core, where N is greater than one.

7. A method of manufacturing a position indicator comprising:

providing a ferrite core including a hole;

winding a coil around a periphery of the ferrite core;

providing a pressure detector;

arranging a shock-absorbing member formed of elastic material at a proximal end in the axial direction of the ferrite core to elastically couple the ferrite core with the pressure detector;

inserting a rod through the hole of the ferrite core;

enclosing, in a case, the ferrite core on which the coil is wound, the shock-absorbing member, the pressure detector, and the rod, such that a distal end of the rod protrudes from a distal end in the axial direction of the ferrite core to the outside of the case to serve as a position indicating portion, and that a proximal end of the rod protrudes from the proximal end in the axial direction of the ferrite core, wherein the proximal end is positioned and configured to press upon the pressure detector when a pressure is applied to the position indicating portion of the rod and wherein the pressure detector is configured to detect the pressure applied to the position indicating portion of the rod;

wherein the shock-absorbing member comprises a first cylindrical portion that connects with the proximal end of the ferrite core and a second cylindrical portion that connects with the pressure detector, an inner diameter of the first cylindrical portion is substantially equal to an outer diameter of the ferrite core, and the pressure detector includes a first mating portion and the second cylindrical portion includes a second mating portion that is configured to engage with the first mating portion.

8. The method of claim 7, wherein the first mating portion of the pressure detector is an opening having an inner diameter that is substantially equal to an outer diameter of the second cylindrical portion of the shock-absorbing member.

9. The method of claim 7, wherein the step of winding a coil around a periphery of the ferrite core comprises N-fold winding the coil, wherein N is greater than one.

10. The method of claim 9, wherein the coil is formed by a magnetic-plated wire.

11. The position indicator according to claim 1, wherein the first mating portion of the pressure detector is an opening having an inner diameter that is substantially equal to an outer diameter of the second cylindrical portion of the shock-absorbing member.

12. The coordinate input device according to claim 4, wherein the first mating portion of the pressure detector is an opening having an inner diameter that is substantially equal to an outer diameter of the second cylindrical portion of the shock-absorbing member.

* * * * *